United States Patent [19]
Mizuguchi et al.

[11] Patent Number: 4,679,461
[45] Date of Patent: Jul. 14, 1987

[54] DRIVE DEVICE FOR TWO-SHAFT EXTRUDING MACHINE

[75] Inventors: Hideki Mizuguchi; Haruo Yamaguchi; Seigo Hanada; Nobuo Mukuda, all of Hiroshima, Japan

[73] Assignee: The Japan Steel Works, Ltd., Tokyo, Japan

[21] Appl. No.: 780,755

[22] Filed: Sep. 27, 1985

[30] Foreign Application Priority Data

Oct. 17, 1984 [JP] Japan ............................ 59-155743[U]

[51] Int. Cl.$^4$ .......................... F16H 37/06; F16H 3/14
[52] U.S. Cl. .................................. 74/665 GA; 74/377; 74/370
[58] Field of Search .......... 74/665 GA, 377, 665 GC, 74/369, 379, 371, 370

[56] References Cited

U.S. PATENT DOCUMENTS

| | | | |
|---|---|---|---|
| 2,354,204 | 7/1944 | Gentry | 74/665 GA |
| 2,375,952 | 5/1945 | Sinclair | 74/665 GA |
| 3,006,209 | 10/1961 | Stromberg | 74/377 |
| 3,359,826 | 12/1967 | Hanslik | 74/665 GA |
| 3,922,997 | 12/1975 | Jameson | 74/665 GA |
| 4,261,225 | 4/1981 | Zahradnik | 74/665 GA |

FOREIGN PATENT DOCUMENTS

37414 9/1980 Japan ............................ 74/665 GA
59-202 6/1984 Japan .

*Primary Examiner*—Allan D. Herrmann
*Assistant Examiner*—Martin G. Belisario
*Attorney, Agent, or Firm*—Sughrue, Mion, Zinn, Macpeak & Seas

[57] ABSTRACT

A drive device for a two-shaft extruding machine whereby the directions of relative rotation of the two screw shafts of the machine can be rapidly changed without having to manually change a gear. The drive device includes a first shaft, a second shaft disposed coaxially with the first screw shaft and rotatable integrally therewith, a third shaft disposed coaxially with the intermediate shaft and rotatable integrally therewith, a first gear rotatable integrally with the first shaft, a second gear rotatable integrally with the second shaft and meshed with the first gear, a third gear rotatably supported on the third shaft and meshed with the first gear, and a fourth gear rotatable integrally with the second shaft and a fifth gear rotatably supported on the third shaft and meshed with the fourth gear. A claw clutch is provided for rotatably coupling a selected one of the third and fifth gear to the third shaft. An operating mechanism controls the operating position of the claw clutch from a point outside the drive device.

7 Claims, 3 Drawing Figures

DRIVE DEVICE FOR TWO-SHAFT EXTRUDING MACHINE

BACKGROUND OF THE INVENTION

The present invention relates to a drive device for a two-shaft extruding machine.

A two-shaft extruding machine of the same general type to which the invention pertains has been disclosed, for example, in Japanese Utility Model Publication No. 202/1984. In this drive device, two driven shafts are disposed equidistantly from a drive shaft, and each of the three shafts is provided with a gear. The gears can be changed so that rotational states in the same direction and in the opposite direction can be realized. That is, the gear on a first of the driven shafts is always meshed with the gear on the drive shaft, while the gear on the second driven shaft can be selectively meshed with either the gear on the first driven shaft or the gear on the drive shaft. Thus, the second drive shaft can be made to rotate in a desired direction by mounting an appropriate gear thereon.

In the prior art two-shaft extruding machine drive device described above, however, there has been a problem that when the rotational direction of the screw (normally associated with the second driven shaft) is reversed, it is necessary to disassemble the drive device to replace the gear on the screw. Thus, although it is possible in such a drive device to change the rotational direction of the screw, much labor and time are required to change the gear, resulting in low productivity.

An object of the invention is therefore to solve the problem described above, that is, to provide a two-shaft extruding machine drive device in which the rotational direction of the screw can be changed easily and externally without disassembling the drive device.

SUMMARY OF THE INVENTION

According to the present invention, the above-discussed problem is solved by providing a claw clutch capable of selectively coupling two gears with shafts on which the gears are rotatably mounted.

More specifically, a two-shaft extruding machine drive device according to the present invention comprises a first shaft, a second shaft disposed coaxially with one screw shaft and coupled therewith so as to be rotatable integrally therewith, a third shaft disposed coaxially with an intermediate shaft and coupled therewith so as to be rotatable integrally therewith, a first gear rotatable integrally with the first shaft, a second gear disposed to be rotatable integrally with the second shaft and meshed with the first gear, a third gear supported so as to be rotatable on the third shaft and meshed with the first gear, a fourth gear rotatable integrally with the second shaft, a fifth gear rotatably supported on the third shaft and meshed with the fourth gear, a claw clutch for coupling a selected one of the third and fifth gears with the third shaft, and an operating mechanism for operating a claw clutch from a point outside of the drive device.

In this two-shaft extruding machine drive device, in the case where the claw clutch is actuated to couple the third shaft with the third gear, the rotational force of the first shaft is transmitted to the first gear, the third gear, the third shaft, and the intermediate shaft successively in the stated order so that the two screw shafts are caused to rotate in opposite directions. On the other hand, in the case where the claw clutch couples the fifth gear with the third shaft, the rotational force of the first shaft is transmitted to the first gear, the second gear, the second shaft, the fourth gear, the fifth gear, the third shaft, and the intermediate shaft successively in the stated order so that the two screws are caused to rotate in the same direction. The changeover operation of the claw clutch can be performed easily in a short time by merely operating the operating mechanism from a point outside of the drive device.

DESCRIPTION OF THE PREFERRED EMBODIMENTS

Figure 1:
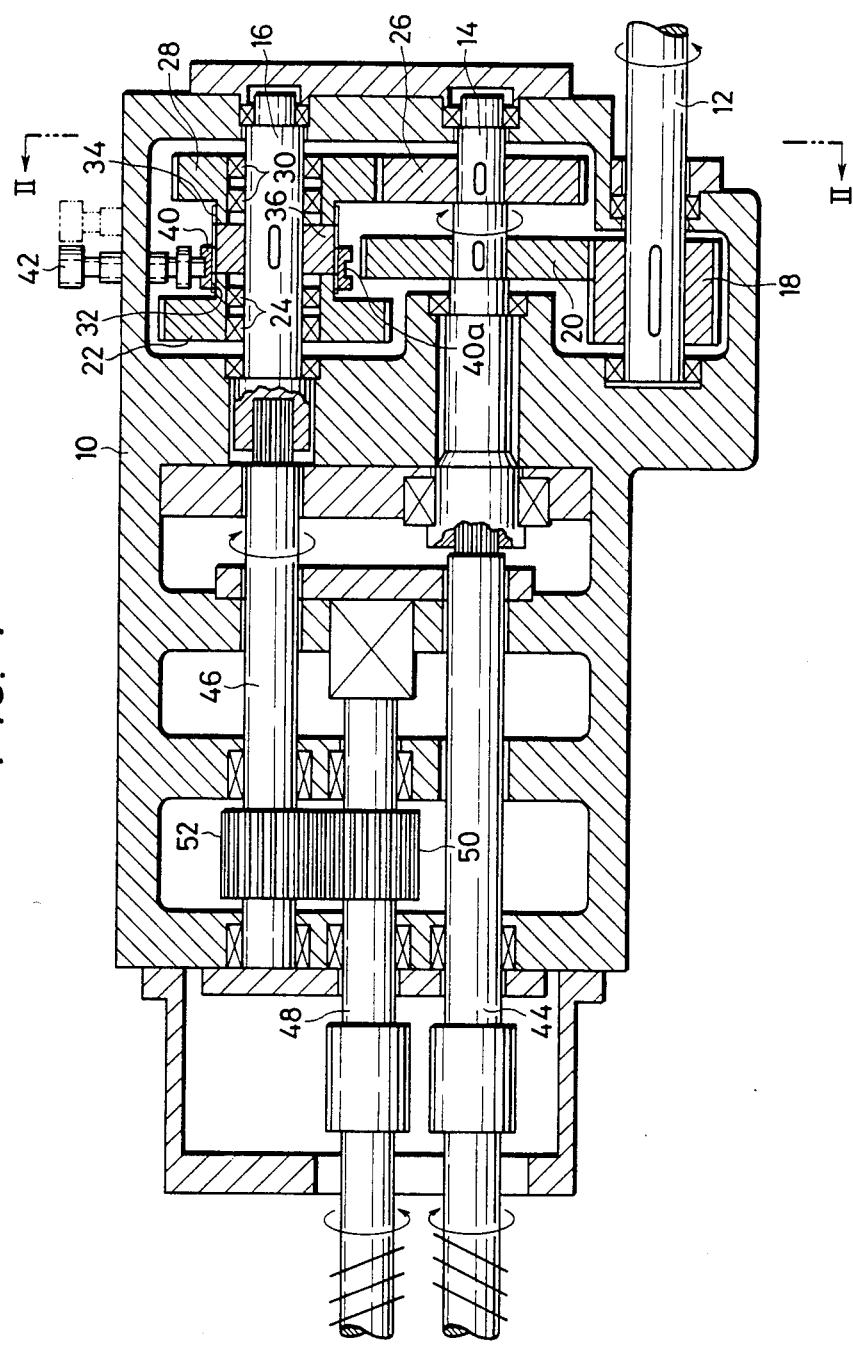
FIG. 1 is a developed sectional view showing a two-shaft extruding machine drive device according to the present invention.
Figure 2:
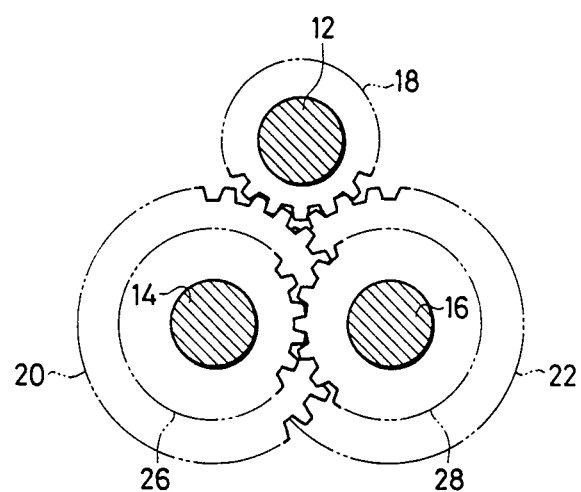
FIG. 2 is a cross-sectional view taken along a line II—II in FIG. 1 showing the positional relationship among various shafts.

Referring to FIGS. 1 and 2 of the accompanying drawings, a preferred embodiment of the invention will be described hereunder.

In a casing 10 of a drive device, three shafts, namely a first, a second and a third shaft 12, 14 and 16 respectively, are rotatably supported through respective bearings. As shown in FIG. 2, the second and third shafts 14 and 16 are disposed equidistantly from the first shaft 12, and a first gear 18 is mounted on the first shaft 12 and rotated integrally therewith. A second gear 20 and a third gear 22, each of which is meshed with the first gear 18, are disposed on the second shaft 14 and the third shaft 16, respectively. (Since FIG. 1 is a developed view, it appears that the first gear and the third gear are not in mesh; however, they are actually meshed with each other as shown in FIG. 2.) The second gear 20 is rotatable integrally with the second shaft 14, while the third gear 22 is rotatably supported on the third shaft 16 through bearings 24. The second and third gears 20 and 22 are of like dimensions.

A fourth gear 26 and a fifth gear 28 are mounted on the second shaft 14 and the third shaft 16, respectively, and meshed with each other. The fourth gear 26 is arranged so as to rotate integrally with the second shaft 14, while the fifth gear 28 is supported on the third shaft 16 through bearings 30 so as to be rotatable relative to the shaft 16. The fourth gear 26 and the fifth gear 28 are of like dimensions.

The third and fifth gears 22 and 28 have outer-tooth spline portions 32 and 34, respectively, on their sides facing each other. The outer-tooth spline portions 32 and 34 and the outer-tooth wheel 36 have the same dimensions with respect to the splines. An inner-tooth spline wheel 40, having an inner-tooth spline portion corresponding to the outer-tooth spline portion 32, the outer-tooth spline portion 34, and the outer-tooth spline wheel 36, is disposed at the outer periphery of the outer-tooth spline portion 32, the outer-tooth spline portion 34, and the outer-tooth spline wheel 36.

The inner-tooth spline wheel 40 has a circumferential groove 40a formed in its outer periphery, and the tip end of a lever 42 (constituting an operating mechanism) is engaged with the groove 40a. The inner end of the lever 42 is movable in the axial direction of the third shaft 16. The outer end of the lever 42 projects outside the casing 10, thereby making it possible to axially move the inner tooth spline wheel 40 from outside the casing 10. The outer-tooth spline wheel 36, the outer-tooth spline portions 32 and 34 and the inner-tooth spline wheel 40 constitute a claw clutch.

A first screw shaft 44 is mounted so as to be rotatable coaxially with the second shaft 14; the second shaft 14 and the first screw shaft 44 are coupled through splines. Furthermore, an intermediate shaft 46 and the third shaft 16 are coupled through splines so that they rotate integrally. A second screw shaft 48, disposed adjacent the first screw shaft 44, is coupled with the intermediate shaft 46 through gears 50 and 52 of like dimensions.

The operation of this drive device will now be described.

When the first screw shaft 44 and the second screw shaft 48 are to be rotated in opposite directions, the lever 42 is set at the position indicated by a solid line in FIG. 1, that is, the position closer to the third gear 22. Thus, the inner-tooth spline wheel 40 is meshed with both the outer-tooth spline portion 32 and the outer-tooth spline wheel 36 so as to cause the outer-tooth spline wheel 36 and the third gear 22 to rotate integrally. In other words, the third gear 22 is in the state of integral rotation with the third shaft 16. In this state, when the first shaft 12 is driven by a drive source such as an electric motor (not shown) in a predetermined direction, the second and third gears 20 and 22 meshed with the first gear 18 are driven to rotate. The second and third gear 20 and 22 then rotate in the same direction. The rotation of the second gear 20 is transmitted to the first screw shaft 44 through the second shaft 14. As described above, the third gear 22 and the third shaft 16 are made to rotate integrally by the claw clutch so that the rotation of the third gear 22 is transmitted to the third shaft 16 and then to the intermediate shaft 46. The rotation of the intermediate shaft 46 is transmitted to the second screw shaft 48 through the gears 52 and 50. Due to the gears 52 and 50, the rotational direction of the second screw shaft 48 is opposite that of the intermediate shaft 46. Therefore, the first and second screw shafts 44 and 48 rotate at the same speed but in opposite directions.

In the case where the first and second screw shafts 44 and 48 are to be rotated in the same direction, the lever 42 is shifted to the position indicated by a phantom line in FIG. 1, that is, the position closer to the fifth gear 28. As a result, the coupled state between the outer-tooth spline wheel 36 and the outer-tooth spline portion 32 of the third gear 22 is released, while the outer-portion spline wheel 36 is coupled to the outer-tooth spline portion 34 of the fifth gear 28. That is, the fifth gear 28 is placed in the state where it rotates integrally with the third shaft 16. In this state, when the first shaft 12 is driven to rotate in the same manner described above, the second gear 20 and the third gear 22 are driven by the first gear 18. The third gear 22 is then idled. Similar to the case described above, the first screw shaft 44 rotates in the same direction as the second gear 20 due to the rotation of the second gear 20. On the second shaft 14, which rotates integrally with the second gear 20, the fourth gear 26 is mounted so as to rotate integrally with the second shaft 14. Being meshed with the fourth gear 26, the fifth gear 28 rotates at the same speed as but in the opposite direction to the second gear 20. Since the fifth gear 28 in this case rotates integrally with the third gear 16, the intermediate shaft 46 also rotates integrally with the third shaft 16. As the rotation of the intermediate shaft 46 is transmitted to the second screw shaft 48 through the gears 52 and 50, the rotational direction is reversed again so that the second screw shaft 48 rotates in the same direction as the second gear 20. Namely, the first and second screw shafts 44 and 48 rotate in the same direction and at the same speed.

As described above, the rotational direction of the second screw shaft 48 can be controlled by shifting the lever 42 in the desired direction from a point outside the casing 10. That is, merely by changing the position of the lever 42, the rotational direction of the first and second screw shafts 44 and 48 can be changed between a state where they rotate in the same direction and another state where they rotate in opposite directions. Therefore, because the rotational direction can be readily changed as desired, the productivity of the extruding machine is improved. Further, although the first shaft 12 is driven by an electric motor in this embodiment, the second shaft 14 or the third shaft 16 may be driven so that the respective shaft rotates in the same relationship to thereby perform the same function. Furthermore, although the second and third shafts 14 and 16 are coupled with the first and second screw shafts 44 and 48, respectively, through spline portions in the described embodiment, it is apparent that quite the same function can be achieved if these members be composed of an integral member. Further, although in the described embodiment the second and third shafts 14 and 16 are disposed equidistantly from the first shaft 12 and the second gear 20 has the same dimensions as the third gear 22 and the gear 50 the same dimensions as the gear 52, all these gears may be disposed equidistantly and have the same dimensions.

Figure 3:
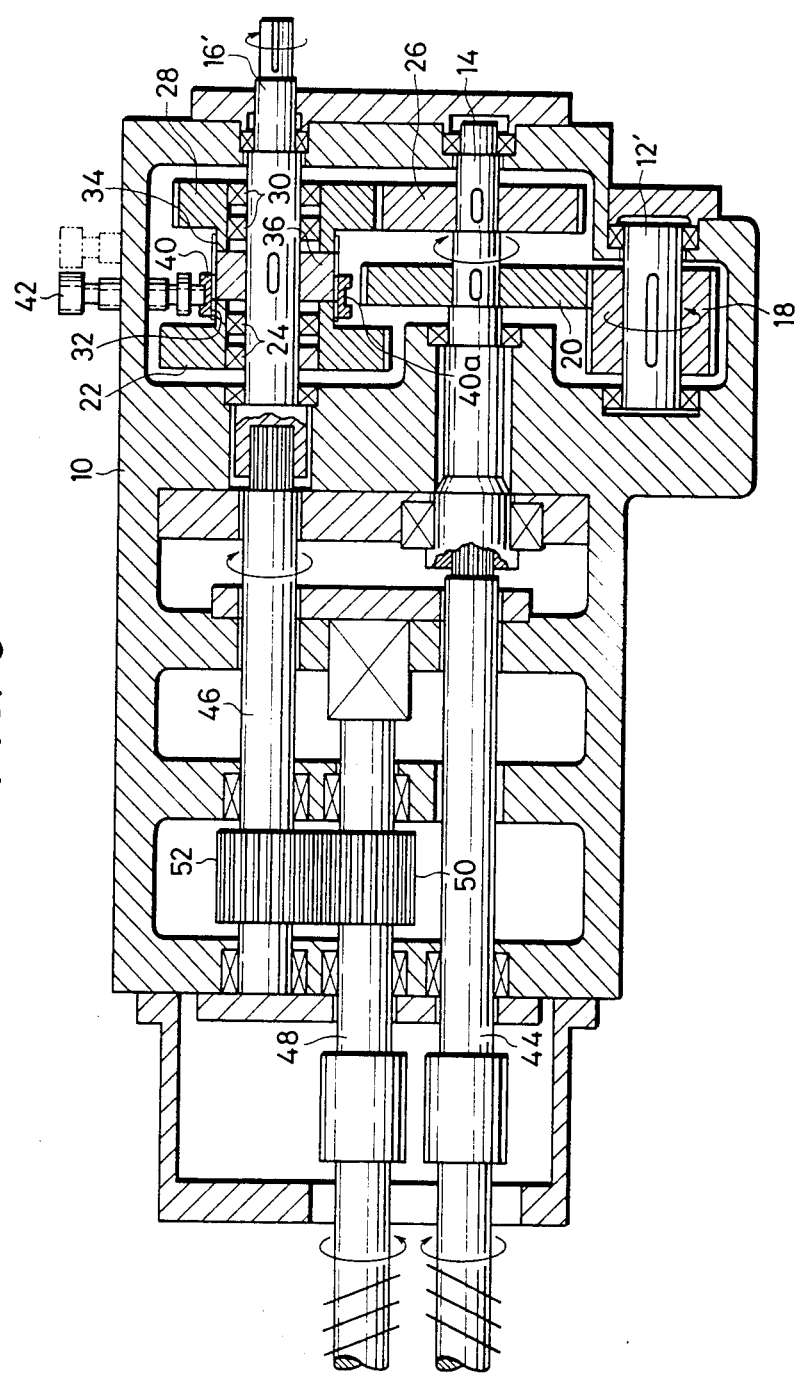
FIG. 3 is a developed sectional view, similar to FIG. 1, showing a drive device in accordance with another embodiment of the invention.

FIG. 3 shows another embodiment of the present invention, in which the same reference numerals shown in FIGS. 1 and 2 are used to designate the same components or members. What is different between both the embodiments is that, in FIG. 3, a third shaft 16' is used as a drive shaft and a first shaft 12' is used as a driven shaft. From the description of the preceding embodiment shown in FIGS. 1 and 2, it is apparent from one skilled in the art how the drive device is constructed and operated. Therefore, the detailed description therefor has been omitted.

It is apparent that the present invention is not limited to the specific embodiments shown but many modifications and variations are possible within the scope defined by the appended claims. For example, the splines at the coupling portion between the intermediate shaft 46 and the second shaft 16 or 16' may be omitted by integrally forming in the two components. Similarly, the splines between the first screw shaft 44 and the second shaft 14 may be omitted. Also, the positions or locations of the various bearings are not limited to those shown in the drawings.

As discussed above, according to the present invention, the rotational direction of the screw shafts is made easily changeable through a claw clutch capable of being operated from outside the casing of the drive device so that changeover of the rotational direction of the screw shafts can be performed very easily with a simple operation, resulting in an improvement in productivity in the two-shaft extruding machine.

We claim:

1. In a two-shaft extruding machine, a drive device for driving a first (44) of two screw shafts of said machine directly and driving a second (48) of said screw shafts through an intermediate shaft (46) and a pair of meshed gears (50,52), the improvement wherein said drive device comprises: a first shaft (12); a second shaft (14) disposed coaxially with said first screw shaft and rotatable integrally therewith; a third shaft (16) disposed coaxially with said intermediate shaft and rotatble integrally therewith; a first gear (18) rotatable integrally with said first shaft; a second gear (20) rotatable integrally with said second shaft and meshed with said first gear; a third gear (22) rotatably supported on said third shaft and meshed with said first gear; a fourth gear (26) rotatable integrally with said second shaft; a fifth gear (28) rotatably support on said third shaft and meshed with said fourth gear; a claw clutch (32,34,30,40) for coupling a selected one of said third and fifth gears to rotate integrally with said third shaft, whereby said second screw shaft can be selectively driven in one of the same and the opposite directions as said first screw shaft is driven; a casing (10) inside of which portions of said first, second and third shafts which respectively support said first, second and fourth, and third and fifth gears, are rotatably disposed; means for rotatably supporting said first, second and third shafts inside said casing and an operating mechanism (42) for operating said claw clutch from outside said casing.

2. The two-shaft extruding machine of claim 1, wherein said second shaft is formed integrally with said first screw shaft.

3. The two-shaft extruding machine of claim 1, wherein said third shaft is formed integrally with said intermediate shaft.

4. The two-shaft extruding machine of claim 1, wherein said claw clutch comprises: a spline wheel (36) fixed to said third shaft and mounted between said third gear and said fifth gear, said third gear and said fifth gear having spline portions (32,34) formed thereon adjacent said spline wheel; and means for selectively engaging said spline wheel with a selected one of said spline portions of said third gear and said fifth gear.

5. The two-shaft extruding machine of claim 4, wherein said spline wheel comprises an outer-tooth spline wheel, wherein said spline portions of said third and fifth gears comprise outer-tooth spline portions, and wherein said engaging means comprises an inner-tooth spline wheel (40) slidably disposed around said outer-tooth spline wheel and slidably mounted so as to selectively engage said outer-tooth spline wheel with a selected one of said outer-tooth spline portions of said third gear and said fifth gear.

6. The two-shaft extruding machine of claim 1, wherein said first shaft is used as a drive shaft.

7. The two-shaft extruding machine of claim 1, wherein said third shaft is used as a drive shaft.

* * * * *